United States Patent [19]

Mehta

[11] Patent Number: 5,038,851

[45] Date of Patent: Aug. 13, 1991

[54] ELECTRONIC PROGRAMMABLE THERMOSTAT FOR A HEATING AND COOLING SYSTEM WITH AN OSCILLATION CONTROL MECHANISM

[75] Inventor: Vinay Mehta, Germantown, Tenn.

[73] Assignee: Hunter Fan Company, Memphis, Tenn.

[21] Appl. No.: 256,986

[22] Filed: Oct. 13, 1988

[51] Int. Cl.[5] .............................................. F25B 29/00
[52] U.S. Cl. ................................. 165/12; 236/46 R; 236/1 C; 165/26; 165/27; 364/557
[58] Field of Search ............................ 165/12, 26, 27; 236/46 R, 1 C; 364/557

[56] References Cited

U.S. PATENT DOCUMENTS

| 4,071,745 | 1/1978 | Hall | 165/22 |
| 4,200,910 | 4/1980 | Hall | 165/22 |
| 4,386,649 | 6/1983 | Hines et al. | 236/46 R |
| 4,388,692 | 6/1983 | Jones et al. | 165/12 |
| 4,445,567 | 5/1984 | Nelson | 165/29 |
| 4,632,177 | 12/1986 | Beckey | 165/12 |
| 4,635,708 | 1/1987 | Levine | 165/12 |
| 4,682,279 | 7/1987 | Watabe | 165/12 |
| 4,733,719 | 3/1988 | Levine | 165/12 |
| 4,771,392 | 9/1988 | Hall | 165/12 |
| 4,841,738 | 6/1989 | Katsuki et al. | 165/26 |

FOREIGN PATENT DOCUMENTS

0202441 12/1982 Japan ................................. 165/26

*Primary Examiner*—John K. Ford
*Attorney, Agent, or Firm*—Banner, Birch, McKie, Beckett

[57] ABSTRACT

The programmable thermostat includes a sensor for sensing the ambient temperature within the predetermined volume of space, a timer for generating the current time of day, and a memory for storing a plurality of program times, and a heating and a cooling control temperature corresponding to each program time. The memory also stores a first temperature span associated with the heating control temperatures and a second temperature span associated with the cooling control temperatures. The current ambient temperature is compared to a first temperature above the heating control temperature, a second temperature below the heating control temperature, a third temperature above the cooling control temperature, and a fourth temperature below the cooling control temperature. These comparisons generate a switching control signal for controlling the on/off state of the heating and cooling systems. The first, second, third, and fourth temperatures are fixed by the first and second temperature spans. An alternation controller controls the alternation of operation of the heating system and the cooling system. The alternation controller includes a first adjustor for adjusting the first temperature span to a first adjusted temperature span prior to an alternation from the cooling system to the heating system. A second adjustor adjusts the second temperature span to a second adjusted temperature span prior to the alternation from the heating system to the cooling system.

34 Claims, 5 Drawing Sheets

ELECTRONIC PROGRAMMABLE THERMOSTAT FOR A HEATING AND COOLING SYSTEM WITH AN OSCILLATION CONTROL MECHANISM

BACKGROUND OF THE INVENTION

The present invention generally relates to programmable thermostats and, more particularly, to an electronic programmable thermostat for a heating and cooling system having an oscillation control mechanism.

Programmable thermostats have greatly increased the degree to which a user can control air conditioning systems. "Air conditioning system" as used herein will generally refer to both heating and cooling systems. Programmability permits users to program a plurality of temperature settings for a plurality of program times. Programmability permits high efficiency operation and can result in substantial energy savings. For example, if an air conditioning system is utilized to control the temperature of a personal residence, the on/off switching of the air conditioning system may be precisely determined. It is desirable to have the residence controlled to a comfort temperature during times of occupancy, but in the interest of energy conservation, it is further desirable to have the system control the ambient temperature to some temperature other than the comfort temperature during other times.

In a particular example, a user may program his thermostat such that the cooling system may be switched on at 5:00 P.M. to cool the residence to the program temperature of 78° by 6:00 P.M. when the user returns home from work. The program temperature of 78° may be maintained by the thermostat until 11:00 P.M. when the occupants go to bed. The air conditioner then may be programmed to maintain the house at 76° overnight. From 7:30 A.M. to 9:00 A.M., it may be desirable to have the temperature controlled to 78°. The temperature then may be set up to 85° during the day from 9:00 A.M. to 5:00 P.M. in order to conserve energy. It is important that the temperature not be permitted to rise too much during the unoccupied periods or else the system may require so much energy to bring the ambient temperature to the program temperature that energy savings are eliminated. A similar schedule may be programmed for the heating system during wintertime.

Various programs may be created and modified to suit user lifestyle. Different programs may be entered to control the air conditioning system over weekends when a user is likely to be home at different hours.

A single thermostat may, in some instances, be programmed with both a heating and a cooling program schedule. In some situations, it is desirable to control the ambient temperature in a temperature controlled region over a rather small temperature range. This may require setting the heating and cooling control temperatures close to one another. Such settings, while providing the precise temperature control required, can also result in rapid oscillation between heating and cooling systems. This rapid oscillation is undesirable and inefficient and can cause damage to both the heating and cooling systems.

SUMMARY OF THE INVENTION

Accordingly it is an object of the present invention to provide an electronic programmable thermostat which prevents rapid oscillation between heating and cooling systems.

It is another object of the present invention to provide a method for controlling the alternation between the heating and cooling systems of an air conditioning system.

In accordance with the present invention, a programmable thermostat for an air conditioning system having a heating system and a cooling system is provided for controlling the ambient temperature of a predetermined volume of space. The programmable thermostat includes a sensor for sensing the ambient temperature within the predetermined volume of space, a timer for generating the current time of day, and a memory for storing a plurality of program times and a heating and a cooling control temperature corresponding to each program time. The memory also stores a first temperature span associated with the heating control temperatures and a second temperature span associated with the cooling control temperatures. The programmable thermostat further includes a controller which selectively controls the on/off state of the air conditioning system in response to (1) a comparison of the current time of day with the program times stored in the memory to access the corresponding current heating and cooling control temperatures stored in the memory and (2) a comparison of the current ambient temperature sensed by the sensor with the current heating and cooling control temperatures stored in the memory. The current ambient temperature is compared to a first temperature above the heating control temperature, a second temperature below the heating control temperature, a third temperature above the cooling temperature, and a fourth temperature below the cooling control temperature. These comparisons generate a switching control signal for controlling the on/off state of the heating and cooling systems. The first, second, third, and fourth temperatures are fixed by the first and second temperature spans. An alternation controller controls the alternation of operation of the heating system and the cooling system. The alternation controller includes a first adjustor for adjusting the first temperature span to a first adjusted temperature span prior to an alternation from the cooling system to the heating system. A second adjustor adjusts the second temperature span to a second adjusted temperature span prior to the alternation from the heating system to the cooling system.

BRIEF DESCRIPTION OF THE DRAWINGS

A more complete appreciation of the present invention and many of the attendant advantages thereof will be obtained as the invention becomes better understood by reference to the following detailed description when considered in connection with the accompanying drawings.

DETAILED DESCRIPTION OF THE PREFERRED EMBODIMENT

The present invention relates to a programmable electronic thermostat which may be programmed with both heating and cooling temperatures. Such thermostats may include an automatic mode in which both the heating and cooling systems will be selective activated in order to maintain the program temperatures. However, if the programmed heating and cooling temperatures are too close together, the heating and cooling systems may oscillate.

Figure 1:
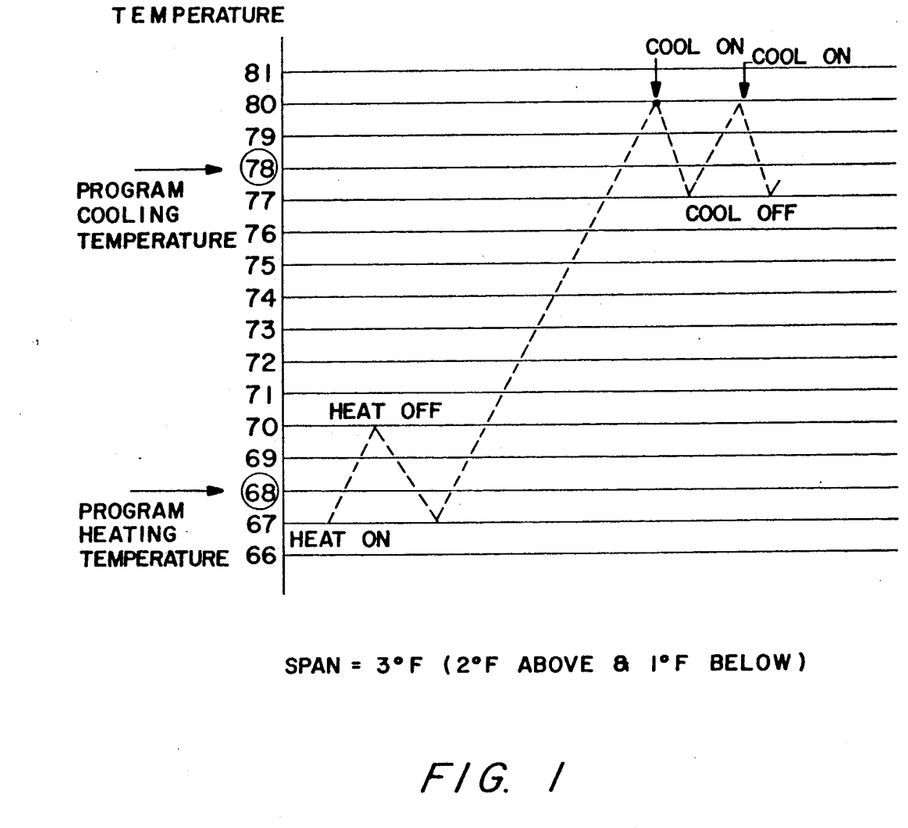
FIG. 1 illustrates a heating and cooling sequence where the programmed heating and cooling temperatures are widely spaced.

The term span as used herebelow refers to the limits of the upper and lower levels of the program temperatures. For example, if the programmed heating temperature is 68° F. as shown in FIG. 1, the heat will switch on at 67° F. (1° F. below the program temperature) and switch off at 70° F. (2° F. above the program temperature). Such on/off switching of the heating system will control the ambient temperature within this 3° span. In a similar manner, if the programmed cooling temperature is 78° F., the cooling system will switch on at 80° F. (2° F. above the program temperature) and switch off at 77° F. (1° F. below the program temperature). A suitable span is generally preset in the thermostat program or may be programmed by a user to a selected fixed or variable number.

A typical heating-cooling program is shown in Table I.

TABLE I

| Program # | Time | Heating Temp. | Cooling Temp. |
|---|---|---|---|
| 1 | 6:00 A.M. | 68° F. | 78° F. |
| 2 | 11:00 A.M. | 55° | 82° |
| 3 | 4:00 P.M. | 69° | 78° |
| 4 | 11:00 P.M. | 60° | 77° |

The operation of a thermostat in automatic mode will be explained with reference to Table I and FIG. 1. At 6:00 A.M., for example, if the ambient temperature is below 68° F., the heating system will switch on to control the ambient temperature around 68° F. in accordance with the programmed span. If, between 6:00 A.M. and 11:00 A.M., the ambient temperature rises to above 78° due to changes in weather conditions, for example, the cooling program will become operative and switch on the cooling system to control the ambient temperature around 78° F. Similarly, at 4:00 P.M., if the ambient temperature falls below 68° F., the heating system will control the temperature. On the other hand, if the ambient temperature rises above 78° F., the cooling system will control the ambient temperature.

In some instances, the programmed heating and cooling temperatures may be very close together. Table II illustrates such a situation.

TABLE II

| Program # | Time | Heating Temp. | Cooling Temp. |
|---|---|---|---|
| 1 | 6:00 A.M. | 76° F. | 76° F. |
| 2 | 11:00 A.M. | 75° | 76° |
| 3 | 4:00 P.M. | 69° | 78° |
| 4 | 11:00 P.M. | 60° | 77° |

The above situation may be created inadvertently by the user upon programming the thermostat. It may also occur where a user desires to control the ambient temperature over a relatively narrow range. As explained in further detail below, with such heating and cooling programs, it is likely that the heating and cooling systems will oscillate.

Figure 2:
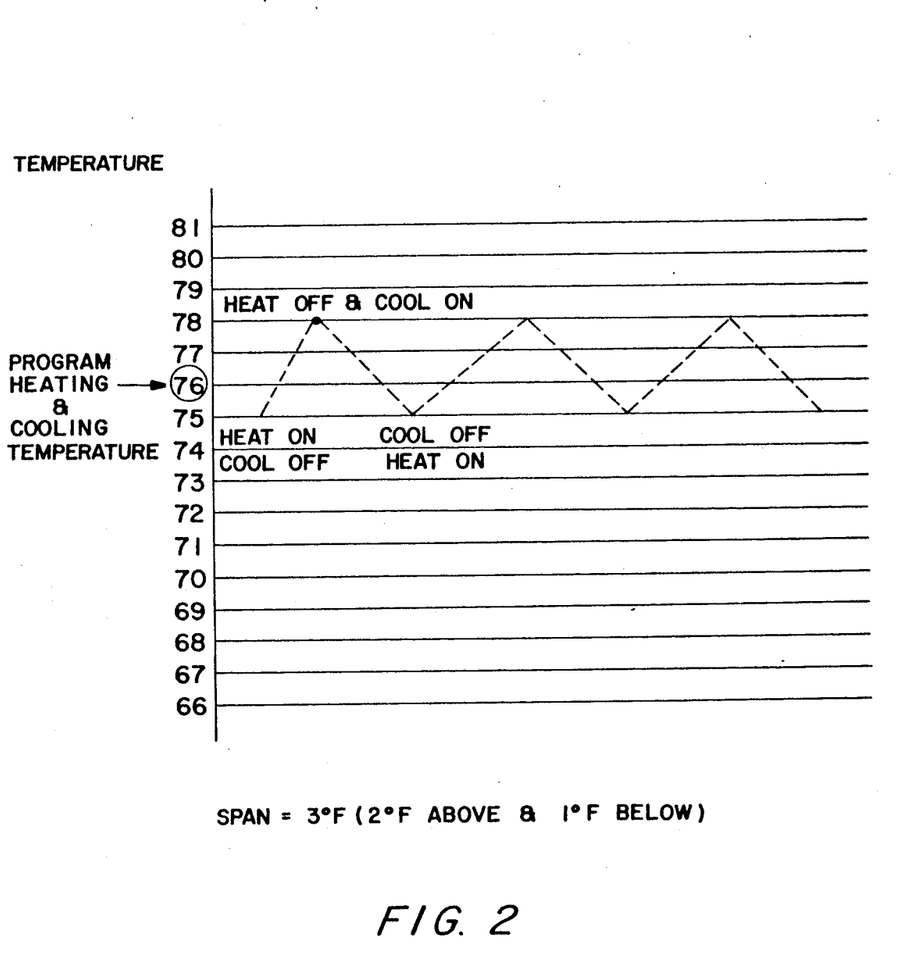
FIG. 2 illustrates a heating and cooling sequence where the programmed heating and cooling temperatures are equal.

For example, oscillation will occur if the temperature span is 3° F., that is, 1° below the setpoint and 2° above the setpoint as shown in FIG. 2. If, between 6:00 A.M. and 11:00 A.M., the ambient temperature falls below 76° to 75°, the heat will switch on and raise the temperature to 78° (2° above the heating setpoint). As soon as the ambient temperature reaches 78° (2° above the cooling setpoint), the cooling system will switch on to lower the temperature to 75° (1° below the cooling setpoint). However, at 75°, the heating system will switch on and the systems will cycle continuously.

In a similar manner, between 11:00 A.M. and 4:00 P.M., if the ambient temperature falls to 74° (1° below the heating setpoint), the heat will switch on and operate until the ambient temperature reaches 77° (2° above the heating setpoint). Later, when a slight change in conditions raises the ambient temperature by a single degree to 78° F. (2° above cooling setpoint), the cooling system will switch on to lower the ambient temperature to 75° (1° below the cooling setpoint). However, as soon as an additional 1° drop occurs, the heat will again switch on and the alternating cycling between systems will continue thereafter with only a short time period therebetween.

The present invention prevents this cycling or oscillation by changing the temperature span to a new value just prior to or any time before the change-over or alternation to the other system. The new value of the temperature span at the time of change-over is different than the span normally designed into the system. Once the change-over takes place, the span returns to the designed span or the new span can be used permanently for that program. The new span may be 4°, 5°, 6°, etc. with equal or unequal temperature limits above and below the setpoint temperatures.

Figure 3:
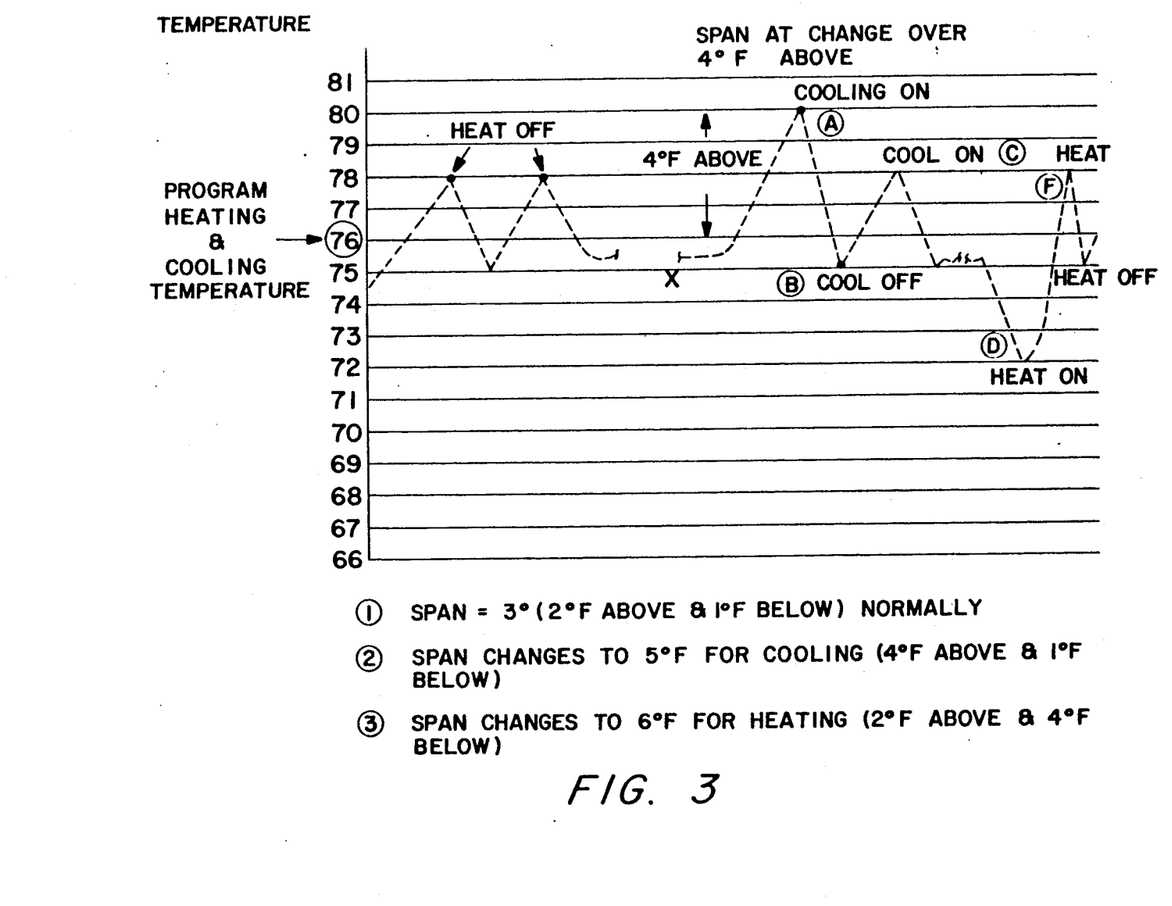
FIG. 3 illustrates a heating and cooling sequence according to one embodiment of the present invention.

Utilizing the programmed heating and cooling temperatures shown in Table II and with reference to FIG. 3, between 6:00 A.M. and 11:00 A.M., the heat will switch on at 75° and switch off at 78°, in accordance with the 3° span. However, at 78°, the cooling system will not switch on. Rather, the span which is currently 3° (2° above the setpoint temperature, 1° below) is changed to a new value. This new value may be preprogrammed into the microprocessor. Alternatively, the new span may be calculated by a formula contained in the microprocessor or programmed externally. The span may be changed to, for example, 5° F., or 4° above the setpoint and 1° below. Because of this change in span, the cooling system will not switch on at 78° F., but will rather be delayed until 80°, 4° above the cooling setpoint as indicated at A. Once the change-over takes place at 80°, the span automatically changes back to 3°, or 2° above and 1° below. Thus, when the cooling system brings the ambient temperature down to 75° (1° below the cooling setpoint), the cooling system is switched off as indicated at B. Again, however, the heating system will not switch on immediately. The span prior to switching changes from 3°, or 2° above and 1° below, to 6°, or 2° above and 4° below, for example. Thus, the heat will not switch on until 72°, 4° below the heating setpoint as indicated at D. As before, the span is automatically reset to the pre-programmed value of 3°. Thus, the heat will switch off at 78° F. as indicated at F. As previously noted, the new spans may be effective throughout the program, and do not have to be reset to the original or pre-programmed value.

Figure 5:
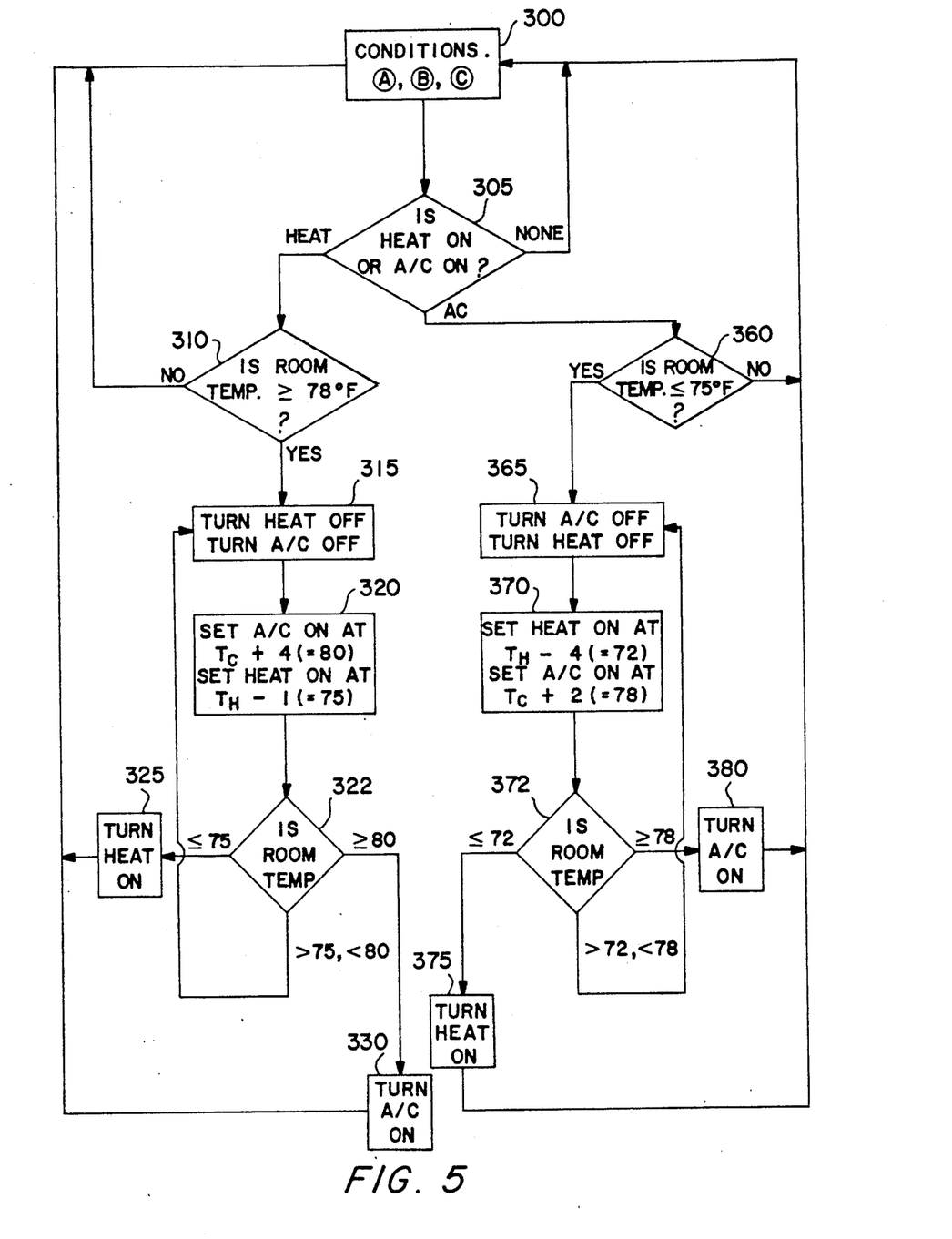
FIG. 5 is a flow diagram of the oscillation control mechanism according to one embodiment of the present invention.

The flow diagram of FIG. 5 further illustrates the oscillation control mechanism described in FIG. 3. Condition A represents the programmed heating temperature ($T_H$) of 76° and the programmed cooling temperature ($T_c$) of 76°. Condition B represents the programmed temperature span of 3°, 2° above the programmed temperature and 1° below. Conditions A and B generate condition C whereby the heating system switches on at 75° and switches off at 78° and the cooling system switches on at 78° and switches off at 75°. This situation will result in the oscillation of the heating and cooling systems at 78° and 75°.

Given conditions A, B, and C at step 300, a determination is made at step 305 whether the heating or cooling system is on. If neither the heating nor cooling system is on, control returns to step 300 and the sequence is repeated. If the heating system is on, control passes to step 310 where a determination is made whether the ambient room temperature is greater than or equal to 78°. If not, control returns to step 300. If so, control passes to step 315 where both the heating and cooling systems are switched off. Control then passes to step 320 where the new temperature span is set. Thus, the span is adjusted such that the cooling system will switch on at 76°+4°, or 4° above the cooling setpoint, and the heating system will switch on at 76°−1°, or 1° below the heating setpoint. After adjustment of the span, control passes to step 322 where the ambient room temperature is determined. If the temperature is less than or equal to 75°, the heating system is switched on at step 325 and control subsequently returns to step 300. If the room temperature is between 75° and 80° control returns to step 315 and the heating and cooling systems are maintained in an off condition. If the temperature is greater than or equal to 80° F., the cooling system is switched on at step 330 and control subsequently returns to step 300.

If it is determined at step 305 that the cooling system is on, control passes to step 360 and a determination is made whether the ambient temperature is less than or equal to 75° F. If not, control returns to step 300. If so, control passes to step 365 where both the cooling and heating systems are switched off. Control then passes to step 370 where the new temperature span is set. Thus, the span is adjusted such that the heating system will switch on at 76°−4°, or 4° below the heating setpoint, and the cooling system will switch on at 76°+2°, or 2° above the cooling setpoint. After adjustment of the span, control passes to step 372 where the ambient room temperature is determined. If the room temperature is less than or equal to 72°, the heating system is switched on at step 375 and control subsequently returns to step 300. If the room temperature is between 72° and 78°, control returns to step 365 and the heating and cooling systems are maintained in an off condition. If the temperature is greater than or equal to 78° F., the cooling system is switched on at step 380 and control subsequently returns to step 300.

In the above-described example, the program temperatures $T_C$ and $T_H$ are the same. Thus, when the heating system switches off, the cooling system immediately switches on. When the cooling system switches off, the heating system immediately switches on. The above-described concept of span adjustment prevents this from occurring. However, the concept is not limited only to situations where the programmed heating and cooling temperatures are equal. The concept is also applicable when the programmed heating and cooling temperatures are close together, for example $T_C=78°$ F. and $T_H=77°$ F. With a programmed span of 3°, 2° above the setpoint temperature and 1° below, the cooling system will switch on at 80° F. and switch off at 77° F. while the heating system will switch off at 79° F. and switch on at 76° F.

In this example, when the cooling system switches off at 77° F., the heating system does not switch on immediately. Similarly, when the heating system switches off, the cooling system does not switch on immediately. However, the switching on of the heating system at 76° and the turning off of the cooling system at 77° F. or the switching on of the cooling system at 80° F. and the switching off of the heating system at 79° does create oscillation with only a very small temperature decrease or increase respectively. By using the above-described technique, rapid oscillation may be prevented. Thus, when the heating system switches off at 79° F., the cooling system will not switch on until 78°+4°, or 82° F. When the cooling system switches off at 77°, the heating system will not switch on until 77°−4°, or 73° F. Therefore, rapid oscillation does not occur.

The present invention also may be extended to a manual override mode when the thermostat is operating in an automatic mode. Override refers to a user's ability to ignore the current program temperature until the subsequent program time. Alternatively, override may be designed to last for a specific time period such as one hour, two hours, etc. If the heating program is overridden to such an extent that the override temperature is close to the current program cooling temperature, cycling between heating and cooling systems as described above may occur. Thus, with reference to program #1 of Table I, if between 6:00 A.M. and 11:00 A.M., the heating setpoint is overridden to 78°, which is close to or equal to the cooling setpoint, it is likely that the cooling system will switch on as soon as, or soon after, the heating system switches off. Span switching as described above can overcome cycling or oscillation in this situation.

Although it is possible to program heating and cooling setpoints which are close to one another, it is not possible to program heating setpoints higher than cooling setpoints or cooling setpoints lower than heating setpoints for any given program. While a user is entering a program, if the heating and cooling setpoints are equal, as in program #1 of Table II, the display preferably warns the user by flashing the program temperature digits to indicate that it is not possible to cross the set point limits.

Figure 4:
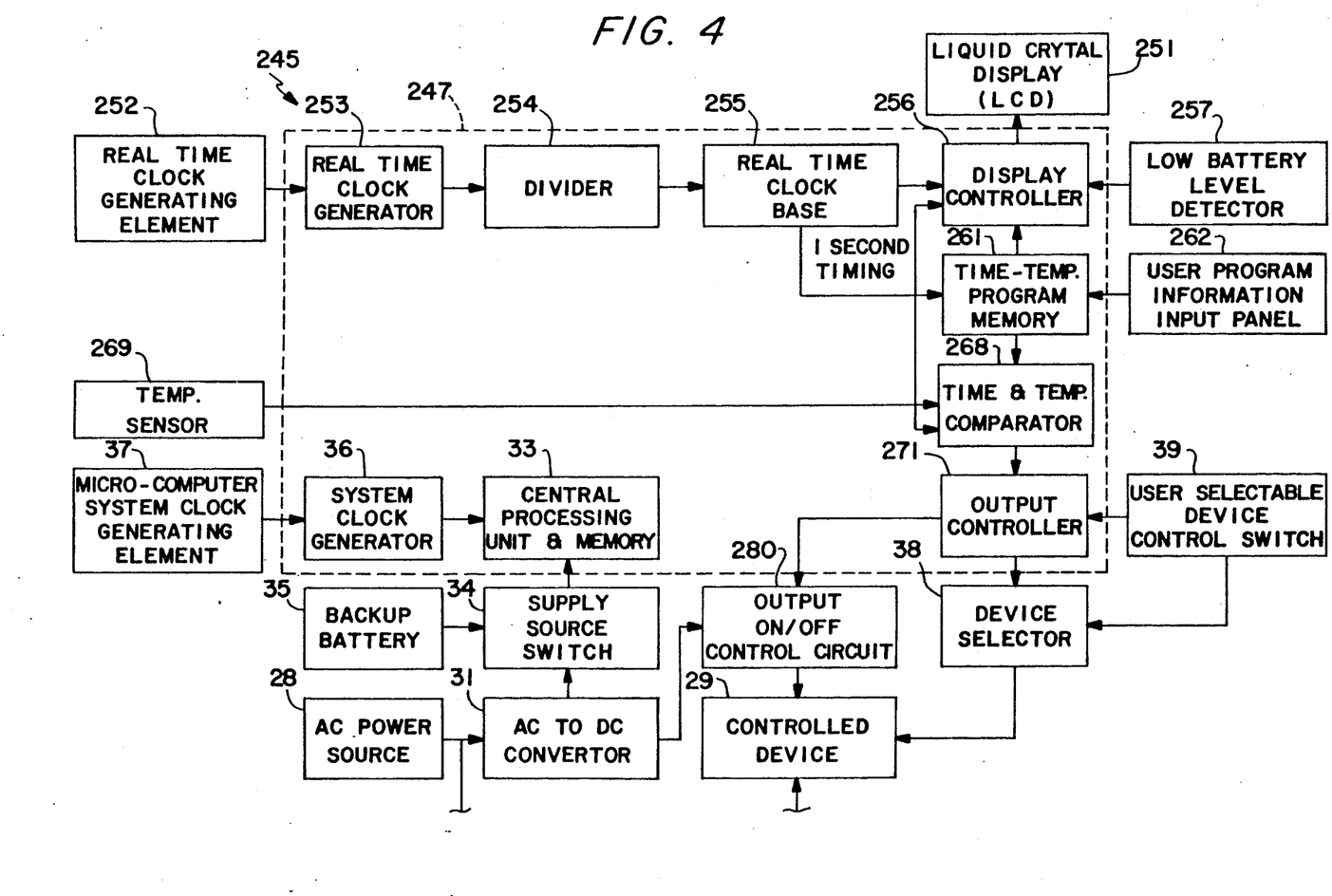
FIG. 4 is a hardware diagram of a thermostat which may embody the present invention.

A hardware diagram of a thermostat embodying the present invention appears in FIG. 4. The thermostat includes a single chip microcomputer having a read only memory (ROM) for software and a random access memory (RAM) for data storage. The component blocks bounded by the broken lines are contained within microcomputer 247. Thermostat 245 includes a real time clock generator 253 which generates a real time timing signal in the presence of real time clock generating element 252. The timing signal generated by clock generator 253 is divided repeatedly by divider 254 to generate a one second timing signal for real time clock base 255. The real time clock tracking of clock base 255 is necessary for the programming (software) features of the thermostat. Real time clock base 255 also provides a signal to display controller 256 which generates the time of day display for LCD 251. Low battery level detector 257 determines when new batteries are needed for the thermostat and provides a signal to display controller 256 to illuminate or flash a low battery prompt on LCD 251.

Component box 262 is a program control data input which is preferably keys on programmable thermostat 245. The program data input to thermostat 245 via these keys is stored in memory 261. Each second, microcomputer 247 compares the program times stored in memory 26 with the real time to determine whether new cooling or heating setpoint temperatures are required. When the real time matches a program time, the control temperatures corresponding to that program time become the reference temperatures against which the ambient temperature sensed by temperature sensor 269 is compared by comparator 268 to determine the operating state of the heating/cooling system. Once the particular on/off criteria is reached, an on/off switching signal is sent to output controller 271 to switch the appropriate device via output on/off control circuit 280 and device selector 281. Control device 29 may include two heaters for heating, two compressors for cooling and a fan for ventilation. A.C. power is supplied to control device 29 by A.C. power source 28.

The invention has been described in detail in connection with the preferred embodiments. These embodiments however are merely for example only and the invention is not limited thereto. It will be easily understood by those skilled in the art that other variations and modifications can easily be made within the scope of this invention as defined by the appended claims.

I claim:

1. A programmable thermostat for an air conditioning system having a heating system and a cooling system for controlling the ambient temperature of a predetermined volume of space, said programmable thermostat comprising:

sensor means for sensing the ambient temperature of the predetermined volume of space;

timing means for generating the current time of day;

memory means for storing an operating program including a plurality of program times, a heating and a cooling control temperature corresponding to each program time, a first temperature span associated with the heating control temperatures which first temperature span determines a first temperature for each program time at which said heating system is switched on and a second temperature for each program time at which said heating system is switched off, and a second temperature span associated with the cooling control temperatures which second temperature span determines a third temperature for each program time at which said cooling system is switched on and a fourth temperature for each program time at which said cooling system is switched off;

control means for selectively controlling the on/off state of said heating and cooling systems in response to (1) a comparison of the current time of day with the program times stored in said memory means to access the corresponding current heating and cooling control temperatures and their associated first and second temperature spans stored in said memory means and (2) a comparison of the current ambient temperature sensed by said sensor means with the current first, second, third and fourth temperatures to generate a switching control signal for controlling the on/off state of said heating and cooling systems; and adjusting means for adjusting (1) at least the current third temperature prior to switching on said cooling system in response to the switching control signal after said heating system is switched off at the current second temperature or (2) at least the current first temperature prior to switching on said heating system in response to the switching control signal after said cooling system is switched off at the current fourth temperature.

2. The programmable thermostat according to claim 1 wherein said adjusting means adjusts the first temperature at which said heating system is switched on to a first adjusted temperature prior to switching on said heating system after said cooling system is switched off.

3. The programmable thermostat according to claim 1 wherein said adjusting means adjusts the third temperature at which said cooling system is switched on to a third adjusted temperature prior to switching on said cooling system after said heating system is switched off.

4. The programmable thermostat according to claim 1 wherein said adjusting means adjusts the first temperature at which said heating system is switched on to a first adjusted temperature prior to switching on said heating system after said cooling system is switched off and adjusts the third temperature at which said cooling system is switched on to a third adjusted temperature prior to switching on said cooling system after said heating system is switched off.

5. The programmable thermostat according to claim 2 wherein said adjusting means adjusts the first adjusted temperature at which said heating system is switched on to the first temperature if said heating system is switched on at the first adjusted temperature.

6. The programmable thermostat according to claim 3 wherein said adjusting means adjusts the third adjusted temperature at which said cooling system is switched on to the third temperature if said cooling system is switched on at the third adjusted temperature.

7. The programmable thermostat according to claim 4 wherein said adjusting means adjusts the first adjusted temperature at which said heating system is switched on to the first temperature if said heating system is switched on at the first adjusted temperature and adjusts the third adjusted temperature at which said cooling system is switched on to the third temperature if said cooling system is switched on at the third adjusted temperature.

8. The programmable thermostat according to claim 2 wherein the first adjusted temperature is lower than the first temperature.

9. The programmable thermostat according to claim 3 wherein the third adjusted temperature is higher than the third temperature.

10. The programmable thermostat according to claim 4 wherein the first adjusted temperature is lower than the first temperature and the third adjusted temperature is higher than the third temperature.

11. A method for controlling the operation of an air conditioning system including heating and cooling systems to thereby control the ambient temperature of a predetermined volume of space, the method comprising the steps of:

(a) comparing the current time of day with program times stored in a memory to access corresponding current heating and cooling control temperatures stored in said memory, a first temperature span being associated with the heating control temperatures which first temperature span determines a first temperature for each program time at which said heating system is switched on and a second temperature for each program time at which said heating system is switched off and a second temperature span being associated with the cooling control temperatures which second temperature span determines a third temperature for each program time at which said cooling system is switched on and a fourth temperature for each program time at which said cooling system is switched off;

(b) comparing the current ambient temperature in the predetermined volume of space which is sensed by a temperature sensor with the current first, second, third, and fourth temperatures;

(c) generating a switching control signal for controlling the on/off state of said heating and cooling systems in response to the comparisons of steps (a) and (b); and (d) adjusting (1) at least the current third temperature prior to switching on said cooling system in response to the switching control signal after said heating system is switched off at the current second temperature or (2) at least the current first temperature prior to switching on said heating system in response to the switching control signal after cooling system is switched off at the current fourth temperature.

12. The method according to claim 11 wherein step (d) comprises adjusting the first temperature at which said heating system is switched on to a first adjusted temperature prior to switching on said heating system after said cooling system is switched off.

13. The method according to claim 11 wherein step (d) comprises adjusting the third temperature at which said cooling system is switched on to a third adjusted temperature prior to switching on said cooling system after said heating system is switched off.

14. The method according to claim 11 wherein step (d) comprises adjusting the first temperature at which said heating system is switched on to a first adjusted temperature prior to switching on said heating system after said cooling system is switched off and adjusting the third temperature at which said cooling system is switched on to a third adjusted temperature prior to switching on said cooling system after said heating system is switched off.

15. The method according to claim 12 further comprising the step of:

(e) adjusting the first adjusted temperature at which said heating system is switched on to the first temperature if said heating system is switched on at the first adjusted temperature.

16. The method according to claim 13 further comprising the step of:

(e) adjusting the third adjusted temperature at which said cooling system is switched on to the third temperature if said cooling system is switched on at the third adjusted temperature.

17. The method according to claim 14 further comprising the steps of:

(e) adjusting the first adjusted temperature at which said heating system is switched on to the first temperature if said heating system is switched on at the first adjusted temperature; and (f) adjusting the third adjusted temperature at which said cooling system is switched on to the third temperature if said cooling system is switched on at the third adjusted temperature.

18. The method according to claim 12 wherein step (d) comprises adjusting the first temperature at which said heating system is switched on to a first adjusted temperature lower than the first temperature prior to switching on said heating system after said cooling system is switched off.

19. The method according to claim 13 wherein step (d) comprises adjusting the third temperature at which said cooling system is switched on to a third adjusted temperature higher than the third temperature prior to switching on said cooling system after said heating system is switched off.

20. The method according to claim 14 wherein step (d) comprises adjusting the first temperature at which said heating system is switched on to a first adjusted temperature lower than the first temperature prior to switching on said heating system after said cooling system is switched off and adjusting the third temperature at which said cooling system is switched on to a third adjusted temperature higher than the third temperature prior to switching on said cooling system after said heating system is switched off.

21. A digital, programmable thermostat for an air conditioning system including a heating system and a cooling system which controls the ambient temperature of a predetermined volume of space, said thermostat comprising:

memory means for storing a heating and a cooling control temperature, a first temperature span associated with the heating control temperature, which first temperature span determines a first temperature at which said heating system is switched on and a second temperature at which said heating system is switched off, and a second temperature span associated with the cooling control temperature, which second temperature span determines a third temperature at which said cooling system is switched on and a fourth temperature at which said cooling system is switched off;

control means for selectively controlling the on/off state of said heating and cooling systems in response to a comparison of the ambient temperature and said first temperature, said second temperature, said third temperature, and said fourth temperature, to generate a switching control signal;

sensor means for sensing the ambient temperature of the predetermined volume of space; and adjusting means for adjusting (1) at least the current third temperature prior to switching on said cooling system in response to the switching control signal after said heating system is switched off at the current second temperature or (2) at least the current first temperature prior to switching on said heating system in response to the switching control signal after said cooling system is switched off at the current fourth temperature.

22. The thermostat according to claim 21 wherein said control means adjusts the first temperature at which said heating system is switched on to a first adjusted temperature prior to switching on said heating system after said cooling system is switched off.

23. The thermostat according to claim 21 wherein said control means adjusts the third temperature at which said cooling system is switched on to a third adjusted temperature prior to switching on said cooling system after said heating system is switched off.

24. The thermostat according to claim 21 wherein said control means adjusts the first temperature at which said heating system is switched on to a first adjusted temperature prior to switching on said heating system after said cooling system is switched off and adjusts the third temperature at which said cooling system is switched on to a third adjusted temperature prior to switching on said cooling system after said heating system is switched off.

25. The programmable thermostat according to claim 22 wherein said control means adjusts the first adjusted temperature at which said heating system is switched on to the first temperature if said heating system is switched on at the first adjusted temperature.

26. The programmable thermostat according to claim 23 wherein said control means adjusts the third adjusted temperature at which said cooling system is switched on to the third temperature if said cooling system is switched on at the third adjusted temperature.

27. The programmable thermostat according to claim 24 wherein said control means adjusts the first adjusted temperature at which said heating system is switched on to the first temperature if said heating system is switched on at the first adjusted temperature and adjusts the third adjusted temperature at which said cooling system is switched on to the third temperature if said cooling system is switched on at the third adjusted temperature.

28. The programmable thermostat according to claim 22 wherein the first adjusted temperature is lower than the first temperature.

29. The programmable thermostat according to claim 23 wherein the third adjusted temperature is higher than the third temperature.

30. The programmable thermostat according to claim 24 wherein the first adjusted temperature is lower than the first temperature and the third adjusted temperature is higher than the third temperature.

31. An air conditioning system for controlling the ambient temperature of a predetermined volume of space and having a heating mode controlled by the on/off switching of a heating system and a cooling mode controlled by the on/off switching of a cooling system, said air conditioning system comprising:

sensor means for sensing the ambient temperature of the predetermined volume of space;

timing means for generating the current time of day;

memory means for storing an operating program including a plurality of program times, a heating and a cooling control temperature corresponding to each program time, a first temperature span associated with the heating control temperatures which first temperature span determines a first temperature for each program time at which said heating system is switched on and a second temperature for each program time at which said heating system is switched off, and a second temperature span associated with the cooling control temperatures which second temperature span determines a third temperature for each program time at which said cooling system is switched on and a fourth temperature for each program time at which said cooling system is switched off;

control means for selectively controlling the on/off state of said heating and cooling systems in response to (1) a comparison of the current time of day with the program times stored in said memory means to access the corresponding current heating and cooling control temperatures stored in said memory means and (2) a comparison of the current ambient temperature sensed by said sensor means with the current first, second, third, and fourth temperatures as determined by the current heating and cooling control temperatures and the first and second temperature spans to generate a switching control signal for controlling the on/off state of said heating and cooling systems; and adjusting control means for adjusting at least one of the first and second temperature spans in response to the switching control signal prior to an alternation from one of the heating and cooling modes to the other.

32. The air conditioning system according to claim 31 wherein said alternation control means adjusts the first temperature at which said heating system is switched on to a first adjusted temperature prior to an alternation from the cooling mode to the heating mode.

33. The air conditioning system according to claim 31 wherein said alternation control means adjusts the third temperature at which said cooling system is switched on to a third adjusted temperature prior to an alternation from the heating mode to the cooling mode.

34. The air conditioning system according to claim 31 wherein said alternation control means adjusts the first temperature at which said heating system is switched on to a first adjusted temperature prior to an alternation from the cooling mode to the heating mode and adjusts the third temperature at which said cooling system is switched on to a third adjusted temperature prior to an alternation from the heating mode to the cooling mode.

* * * * *